(12) United States Patent
Hall et al.

(10) Patent No.: US 10,827,043 B2
(45) Date of Patent: Nov. 3, 2020

(54) NORMALIZATION OF COMMUNICATION BETWEEN DEVICES

(71) Applicants: Mark Hall, Springville, UT (US); Craig Boswell, Draper, UT (US); John Robinson, Spanish Fork, UT (US); Taylor Robbins, Provo, UT (US); David R. Hall, Provo, UT (US)

(72) Inventors: Mark Hall, Springville, UT (US); Craig Boswell, Draper, UT (US); John Robinson, Spanish Fork, UT (US); Taylor Robbins, Provo, UT (US); David R. Hall, Provo, UT (US)

(73) Assignee: Hall Labs LLC, Provo, UT (US)

( * ) Notice: Subject to any disclaimer, the term of this patent is extended or adjusted under 35 U.S.C. 154(b) by 104 days.

(21) Appl. No.: 15/945,013

(22) Filed: Apr. 4, 2018

(65) Prior Publication Data

US 2019/0312959 A1   Oct. 10, 2019

(51) Int. Cl.
  *H04W 4/00*   (2018.01)
  *H04L 29/06*   (2006.01)
  *H04L 12/24*   (2006.01)
  *H04W 56/00*   (2009.01)
  *H04L 5/00*   (2006.01)

(52) U.S. Cl.
  CPC .......... *H04L 69/28* (2013.01); *H04L 5/0055* (2013.01); *H04L 41/0803* (2013.01); *H04L 65/80* (2013.01); *H04W 56/005* (2013.01)

(58) Field of Classification Search
  CPC ... H04L 69/28; H04L 5/0055; H04L 41/0803; H04W 56/005
  See application file for complete search history.

(56) References Cited

U.S. PATENT DOCUMENTS

| | | | | |
|---|---|---|---|---|
| 5,675,807 A | * | 10/1997 | Iswandhi | G01R 31/31727 710/260 |
| 5,768,269 A | * | 6/1998 | Rakib | H04B 1/707 348/E7.07 |
| 5,774,876 A | * | 6/1998 | Woolley | G01S 5/0289 235/385 |
| 5,805,983 A | * | 9/1998 | Naidu | H04B 7/0894 455/503 |
| 5,999,561 A | * | 12/1999 | Naden | H04B 1/707 375/142 |

(Continued)

*Primary Examiner* — Stephen M D Agosta (57) ABSTRACT

The invention is a method and device for normalizing communication. The method includes receiving on a first device a first message via a first protocol from a second device; transmitting a second message to a third device via a second protocol, wherein the second message is transmitted using a first spreading factor; initiating a delay timer upon transmitting the second message, wherein a duration of the delay timer is based on a second spreading factor, wherein the second spreading factor is greater than or equal to the first spreading factor; receiving a third message from the third device via the second protocol, wherein the third message is transmitted using the first spreading factor, and wherein the third message is in response to the second message; and upon the expiration of the delay timer, sending a fourth message to the second device via the first protocol. The device includes the hardware and instructions to perform the method.

20 Claims, 7 Drawing Sheets

(56) References Cited

U.S. PATENT DOCUMENTS

| | | | | |
|---|---|---|---|---|
| 6,262,659 B1* | 7/2001 | Korkosz | G08C 15/12 | 340/539.24 |
| 7,046,718 B1* | 5/2006 | Yung | H03J 1/00 | 375/145 |
| 7,333,530 B1* | 2/2008 | Rifaat | H04B 1/7093 | 375/147 |
| 7,739,580 B1* | 6/2010 | Fang | H03M 13/353 | 455/101 |
| 7,912,423 B2* | 3/2011 | Imai | H04B 7/15557 | 455/11.1 |
| 8,295,326 B1* | 10/2012 | Reid | H04B 1/7107 | 375/140 |
| 10,284,887 B2* | 5/2019 | Francis | H04H 20/18 | |
| 2002/0159396 A1* | 10/2002 | Carlson | H04L 1/1848 | 370/252 |
| 2002/0184391 A1* | 12/2002 | Phillips | H04L 67/04 | 709/248 |
| 2003/0164084 A1* | 9/2003 | Redmann | G10H 1/0058 | 84/615 |
| 2005/0169353 A1* | 8/2005 | An | H04B 1/7117 | 375/147 |
| 2007/0155314 A1* | 7/2007 | Mohebbi | H04B 7/15507 | 455/11.1 |
| 2008/0045263 A1* | 2/2008 | Speight | H04L 47/14 | 455/552.1 |
| 2008/0094171 A1* | 4/2008 | Sawhney | G07C 9/00103 | 340/5.6 |
| 2009/0067441 A1* | 3/2009 | Ansari | H04L 12/2818 | 370/401 |
| 2010/0325510 A1* | 12/2010 | Nogami | H04B 1/7107 | 714/750 |
| 2011/0167461 A1* | 7/2011 | Maruyama | H04L 12/2838 | 725/81 |
| 2012/0173668 A1* | 7/2012 | Ogata | H04B 7/08 | 709/217 |
| 2014/0297762 A1* | 10/2014 | Chikkanna | H04L 51/20 | 709/206 |
| 2015/0063251 A1* | 3/2015 | Asterjadhi | H04W 74/04 | 370/329 |
| 2015/0063291 A1* | 3/2015 | Merlin | H04L 47/12 | 370/330 |
| 2015/0082130 A1* | 3/2015 | Dunne | H04L 1/0009 | 714/776 |
| 2015/0138983 A1* | 5/2015 | Williams | H04L 47/27 | 370/235 |
| 2015/0208320 A1* | 7/2015 | Alexander | H04W 40/246 | 370/254 |
| 2016/0241452 A1* | 8/2016 | Ringland | H04L 45/24 | |
| 2016/0269691 A1* | 9/2016 | Lee | G08C 17/02 | |
| 2016/0359610 A1* | 12/2016 | Karthik | H04J 3/0664 | |
| 2017/0070947 A1* | 3/2017 | Zhang | H04W 72/04 | |
| 2017/0127403 A1* | 5/2017 | Sapio | H04W 72/0413 | |
| 2017/0256158 A1* | 9/2017 | Kopetz | H04L 41/069 | |
| 2018/0160414 A1* | 6/2018 | Myers | H04W 72/0406 | |
| 2018/0242319 A1* | 8/2018 | Akkarakaran | H04W 72/12 | |

* cited by examiner

NORMALIZATION OF COMMUNICATION BETWEEN DEVICES

TECHNICAL FIELD

The present disclosure generally relates to normalizing response times perceived by users of wireless control systems.

BACKGROUND

Electronic control systems are ubiquitous in our society. Users expect uniform response times from these systems. However, the underlying connection between the various devices may not be uniform.

SUMMARY

In one aspect, the invention is a method for normalizing communication between devices and includes the following steps: receiving on a first device a first message via a first protocol from a second device; transmitting a second message to a third device via a second protocol, wherein the second message is transmitted using a first spreading factor; initiating a delay timer upon transmitting the second message, wherein a duration of the delay timer is based on a second spreading factor, wherein the second spreading factor is greater than or equal to the first spreading factor; receiving a third message from the third device via the second protocol, wherein the third message is transmitted using the first spreading factor, and wherein the third message is in response to the second message; and upon the expiration of the delay timer, sending a fourth message to the second device via the first protocol.

In another aspect, the invention is a device for normalizing wireless communications. The device includes a processor and a memory in electronic communication with the processor. Instructions stored in the memory, the instructions being executable by the processor to do the following: receive a first message via a first protocol from a second device; transmit a second message to a third device via a second protocol, wherein the second message is transmitted using a first spreading factor; initiate a delay timer upon transmitting the second message, wherein a duration of the delay timer is based on a second spreading factor, wherein the second spreading factor is greater than or equal to the first spreading factor; receive a third message from the third device via the second protocol, wherein the third message is transmitted using the first spreading factor, and wherein the third message is in response to the second message; and upon the expiration of the delay timer, send a fourth message to the second device via the first protocol.

In accordance with both aspects, the second message is preferably based on the first message and the first protocol may be a Wiegand protocol. Likewise, the second protocol is preferably be a low power wide area network (WPLAN) protocol such as a long range (LoRa) protocol.

Also, it is preferred to have the second message retransmitted to the third device if an ACK is not timely received from the third device or if a negative acknowledgement (hereinafter "NACK") is received from the third device. An acknowledgement (hereinafter "ACK") may be sent to the third device in response to the third message.

Preferably, the first spreading factor is arrived upon based on a negotiation with the third device. The second spreading factor may be pre-defined. Likewise, the first spreading factor is lower than spreading factor 12. Moreover, communication with the second device may be delayed until after the expiration of the delay timer.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Any patents and published patent applications referred to herein are incorporated in their entirety herein by reference.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, a Token Reader (TR) is a device that receives security information from a User of a system. Typical TRs include but are not limited to a fob reader, a card reader, or a keypad.

As used herein, a Security Token (SR) is personally identifying security information that a User presents to a TR in the form of a pin, fob, card, fingerprint, retina scan, or other such information or device.

The first described embodiment is specific to a "wire-replacement" scenario (in a commercial environment, for example). The invention may be used in situations where wires were not practical in the past, both in buildings, outside of buildings as well as in commercial and private settings. The card-reader, wire-replacement embodiment as described herein provides a good illustration of one embodiment of the described system, devices, and methods.

Keypads, card readers, fob readers, and proximity sensors are commonly used to control access to internal and external doors in a commercial building. A person desiring access to the building must present a card, fob, pin, or other personally identifying an ST to a card reader, fob reader, keypad, or other device which accepts the ST, namely the TR.

The TR in turn passes a request for security access across a physical wire. The opposite end of the wire is typically connected to a control module ("Control Device") which determines, based on the presented Security Token, whether to grant the person access and to unlock the door. The Control Device may send back a message over a physical wire to the Token Reader or to a separate electronically controlled Grant Device which then physically unlocks the door for which access was requested.

As Tokens, TRs, Control Devices, and Grant Devices have matured, their costs have dropped. However, the cost of laying a wire between every door in a building, as part of original construction or a retrofit of the building, has not decreased. In order to save money, many companies are attempting to replace the wire from the token reader to the control device and from the Control Device to the Grant Device with a wireless bridge.

Wireless bridges may be implemented with many different technologies. In one embodiment of the invention, the wireless messages are passed using a low power wide area network (WPLAN) protocol known as the LoRa (LoRa) protocol. See U.S. Pat. No. 7,791,415. Those skilled in the relevant art may implement the wireless connection using other wireless protocols.

LoRa typically uses a license-free sub-gigahertz radio frequency bands such as 169 MHz, 433 MHz, and 868 MHz in Europe and at 915 MHz in North America. When using these crowded frequency ranges at low power, it is typical that a signal will experience intermittent loss. To alleviate loss, the same message or sub-parts of the message are sent multiple times according to a spreading factor. Those skilled in the art are familiar spreading factors, symbol rates and chip rates that are used in implementing wireless communication with direct sequence spread spectrum.

Typically, for conditions where loss is more likely, a larger spreading factor is used. However, a larger spreading factor means that the same message or sub-parts of the message will be sent multiple times, reducing the speed of transmission of the complete message. Hence, the time to transmit a message is directly proportional to the spreading factor selected. As the spreading factor does up, so does the time to transmit a message.

Returning to wire-replacement, if a wire between a token reader and a control device is to be replaced by a wireless connection, the transmission time will typically increase, particularly if a spreading factor greater than 1 is chosen in order to make up for intermittent data loss. A typical building will have many factors which increase data loss, such as concrete walls, concrete floors, steel, wires, screens, rocks, distance, and so forth. A reliable transmission between a token reader and a control device to travel 50 feet in the building might require a spreading factor of 2. However, a transmission covering 5,000-50,000 feet might require a spreading factor of 10.

A building or a campus of buildings, where all token readers must receive access authorization from a control device in a central location, may be able to implement a spreading factor of 2 for the closest token readers and a spreading factor of 10 for the more distant ones.

The problem comes about when a person who typically uses a door in near proximity to the Control Device notes that the door opens within 0.1 seconds of token presentation, but notices a delay of 0.5 seconds when accessing a door 3 km from the control device. As the person presenting a token does not know where the control device is, the person may become frustrated that sometimes a door opens within 0.1 seconds (e.g., essentially immediately) and other similar doors open 0.5 seconds (e.g., a very slight delay) after token presentation. This lack of uniformity due to differences in the underlying communications implementation may be frustrating to persons that set expectations based on one of the doors (especially the quicker door, for example).

The present systems, devices, and methods normalize the token presenter's perceived response time by delaying access according to an algorithm so that response time is the same regardless of the underlying spreading factor which is used. In other words, the present systems, devices, and methods introduce a delay such that the person attempting to access a door whose Token Reader is utilizing a lower spreading factor will experience a delay before the Access Device receives final authorization such that the delay experienced for a lower spreading factor will be similar to the delay experienced for a higher spreading factor.

The users of electronic services ("Services") have come to expect a uniform response time across multiple similar Services. When such Services rely upon a wired connection ("Wired Services") to carry messages between two devices, the response time is perceived to be the same owing to the speed and minimal data loss associated with wired message passing.

However, as Services are implemented with a wireless bridge, delays are introduced due to various factors, including the need to retransmit parts of the message to ensure reliable transport. The Wireless Services then present perceived random delays which are normalized by introducing a delay before a final access grant is perceived by the Token presenter.

Users often do not perceive when they are using a Wired Service or a Wireless Service. They also do not know how far from a control device they are situated or the interference barriers that may exist between their location and the control device. Regardless, they expect all similar Services to behave uniformly. The variation in Wireless Services Response Times causes user frustration.

The frustration of users due to variable response times when using Wireless Services is ameliorated or eliminated by normalizing the Wireless Services response time such that the User substantially experiences a similar response times for similar Services.

Figure 1:
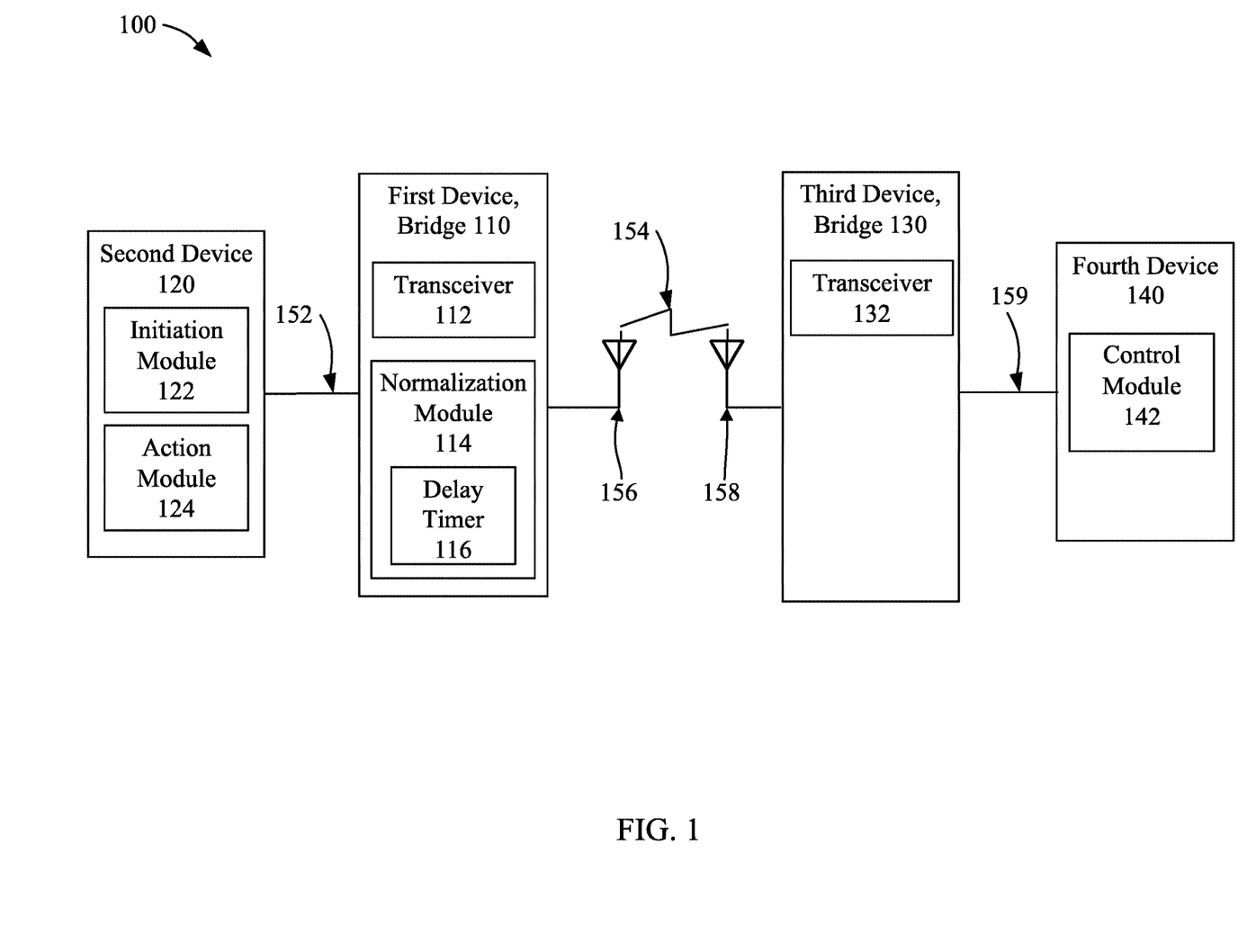
FIG. 1 is a schematic diagram of a system for transmitter side normalization of wireless communications.

Referring to the Figures, FIG. 1 shows an exemplary embodiment in which the described devices and methods may be implemented. In particular, FIG. 1 shows a system for transmitter side normalization of wireless communications 100 comprised of a first device, bridge 110, a second device 120, a third device, bridge 130, and a fourth device 140.

The bridge 110 comprises various components including a transceiver 112, a normalization module 114 and an antenna 156. The transceiver 112 is capable of transmitting a wireless message utilizing antenna 156. The normalization module 114 comprises a delay timer 116. The bridge 110 may also comprise a memory (not shown) and a processor (not shown) in communication with transceiver 112 and the normalization module 114.

The second device 120 is in communication with bridge 110 via a communication link 152. The communication link 152 may be implemented as a physical wired connection. In some embodiments, the communication link 152 may utilize a Wiegand communication protocol comprising one (1) or more physical wires.

The communication link 152 transmits messages from the second device 120 over the communication link 152 and receives response messages from the bridge 110 over communication link 152.

The bridge 130 comprises various components including a transceiver 132 connected to an antenna 158.

The bridge 110 and bridge 130 are configured to communicate with each other across a wireless communication link 154 through transceiver 112 and transceiver 132 and antenna 156 and antenna 158.

The transceiver 112 and transceiver 132 wirelessly communicate using a low power wide area network (WPLAN) protocol. The transceiver 112 and transceiver 132 may be configured to a use a license-free band which is restricted to lower power transmissions. In Europe, typical bands include 169 MHz, 433 MHz, and 868 MHz. North America typically uses 915 MHz. It is appreciated that the present systems, devices, and methods are not restricted to lower power communication or to these specific frequencies.

In some embodiments, the wireless communication may use the LoRa protocol licensed by the LoRa Alliance and specified in the LoRaWan network architecture. While the following description considers the use of LoRa, the present systems, devices, and methods are not restricted to the LoRa protocol and other protocols may be used. The LoRa protocol implements a direct sequence spread spectrum ("DSSS") and repeats portions of each message according to a spreading factor ("Spreading Factor"). The Spreading Factor is a ratio of the number of times each portion of the message is repeated to ensure that the message is able to overcome data loss due to the low power utilized, distance, and transmission obstructions. Typical spreading factors range from 1 to 10, but may go higher. The time required to transmit a message increases (proportionally, for example) based on the spreading factor.

The bridge 130 is connected to the fourth device 140 via a communication link 159. The communication link 159 is typically a wired connection. In some embodiments the communication link 159 may implement the Wiegand Protocol in the same manner that the Wiegand Protocol is implemented with the communication link 152. Thus, the bridge 110 and bridge 130 may enable a wire replacement between communication link 152 and communication link 159. The fourth device 140 may further comprise a control module 142 which processes messages received over communication link 159 and responds to those messages.

In an alternative embodiment, the second device 120 may further comprise an initiation module 122 and an action module 124. In the example given earlier of a fob reader, the initiation module 122 could be implemented as a fob reader that reads personally identifying security information which the fob reader then transmits across communication link 152 to bridge 110. Further, the action module 124 may be implemented as an electronically controlled door unlocking mechanism that is activated in response to an access message received across communication link 152.

Figure 2:
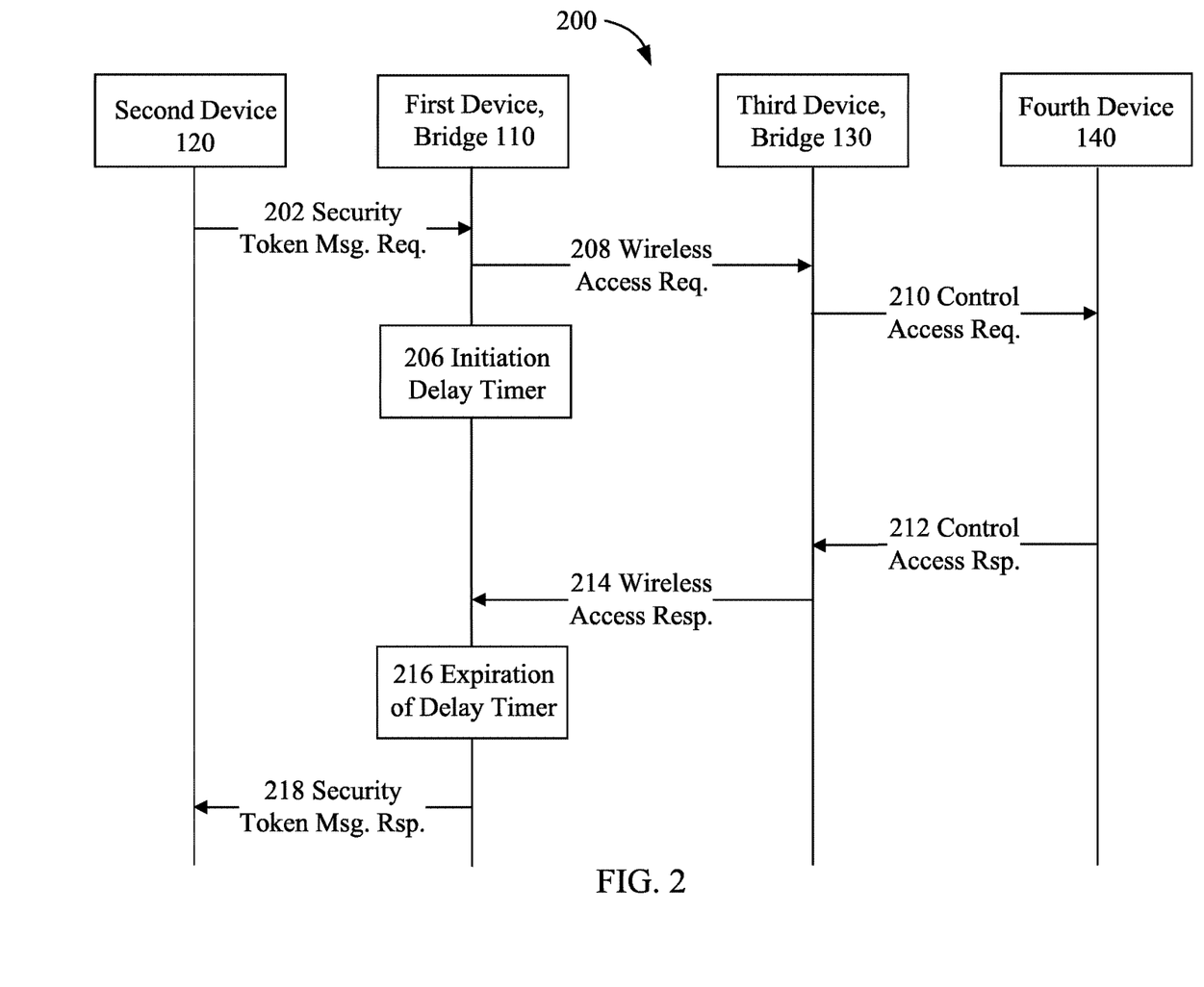
FIG. 2 is a message flow for effecting normalized communication.

Turning to FIG. 2, FIG. 2 illustrates one embodiment of a message flow 200 for effecting normalized communication. Time increases from top to bottom of FIG. 2. A second device 120, which may in one embodiment be implemented as a token reader (TR), sends a security token message request 202 to the bridge 110. The bridge 110 creates a wireless access request 208 which is transmitted wirelessly using a first spreading factor (e.g., Spreading Factor 7) to the bridge 130. At the same time that the wireless access request 208 is transmitted, the normalization module 114 of the bridge 110 initiates 206 the delay timer 116 to a predetermined value. The predetermined value may be used on a spreading factor (a default spreading factor value (e.g., spreading factor 11), for example).

The bridge 130 receives the wireless access request 208 and sends a control access request 210 (i.e., to the fourth device 140) based on the wireless access request 208. The fourth device 140 receives the control access request 210 and determines whether access should be granted and generates a control access response 212 with a positive or negative access setting.

The control access response 212 is received by the bridge 130 which in turn creates a wireless access response 214 based on the control access response 212. The wireless access response 214 may be transmitted using the first spreading factor (e.g. spreading factor 7).

The bridge 110, then creates a security token message response 218 based on the wireless access response 214. If the expiration 216 of delay timer 116 has not completed, then the sending of the security token message response 218 is delayed until the expiration 216 of delay timer 116.

Figure 3:
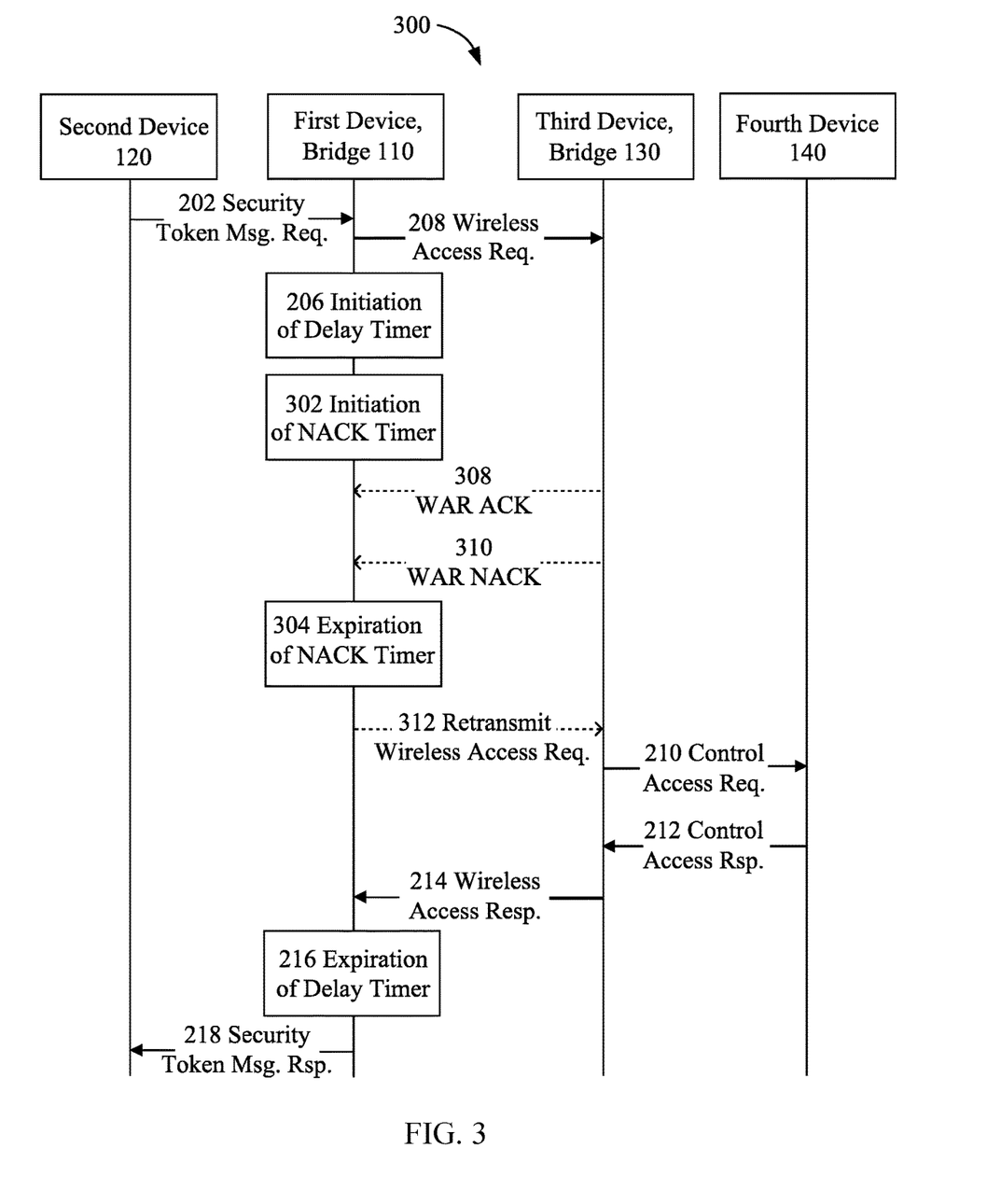
FIG. 3 is a diagram showing an alternative message flow for effecting normalized communication with a NACK timer.

Turning to FIG. 3, another embodiment is shown with a message flow 300 for effecting normalized communication with a NACK timer. The message flow 300 comprises the various flows and elements described in message flow 200 for effecting normalized communication. The message flow 300 further comprises a NACK timer 302 which is started at the same time that the wireless access request 208 is sent to bridge 130 and at the same time that the bridge 110 initiates 206 the delay timer 116. The bridge 110 is configured to send a retransmission of wireless access request 312 if one of two events happens:

a) The NACK timer 302 expires prior to the reception of an wireless access request ACK 308 OR    b) The reception of a wireless access request NACK 310

The wireless access request NACK 310 is generated by the bridge 130 if the wireless access request 208 cannot be processed properly by the bridge 130. The wireless access request NACK 310 notifies bridge 110 that the wireless access request 208 needs to be retransmitted as retransmission of wireless access request 312. The NACK timer 302 allows the bridge 110 to seek a retransmission of wireless access request 312 in the event that a wireless access request ACK 308 is not received in a timely manner.

It is appreciated that when the bridge 110 and bridge 130 are utilizing a smaller spreading factor (e.g., SF 7) than a default spreading factor (e.g., SF 11) associated with the delay timer, then the bridge 110 and the bridge 130 have potentially lots of time to handle retransmissions, etc., to ensure proper communication between the bridge 110 and bridge 130. This is an added benefit to normalizing the bridge communication exchange because even if there is a need for retransmission (on either side), in most cases (cases where smaller spreading factors are used) the delay allows for corrections to be made while still being completed before the expiration of the delay timer.

Figure 4:
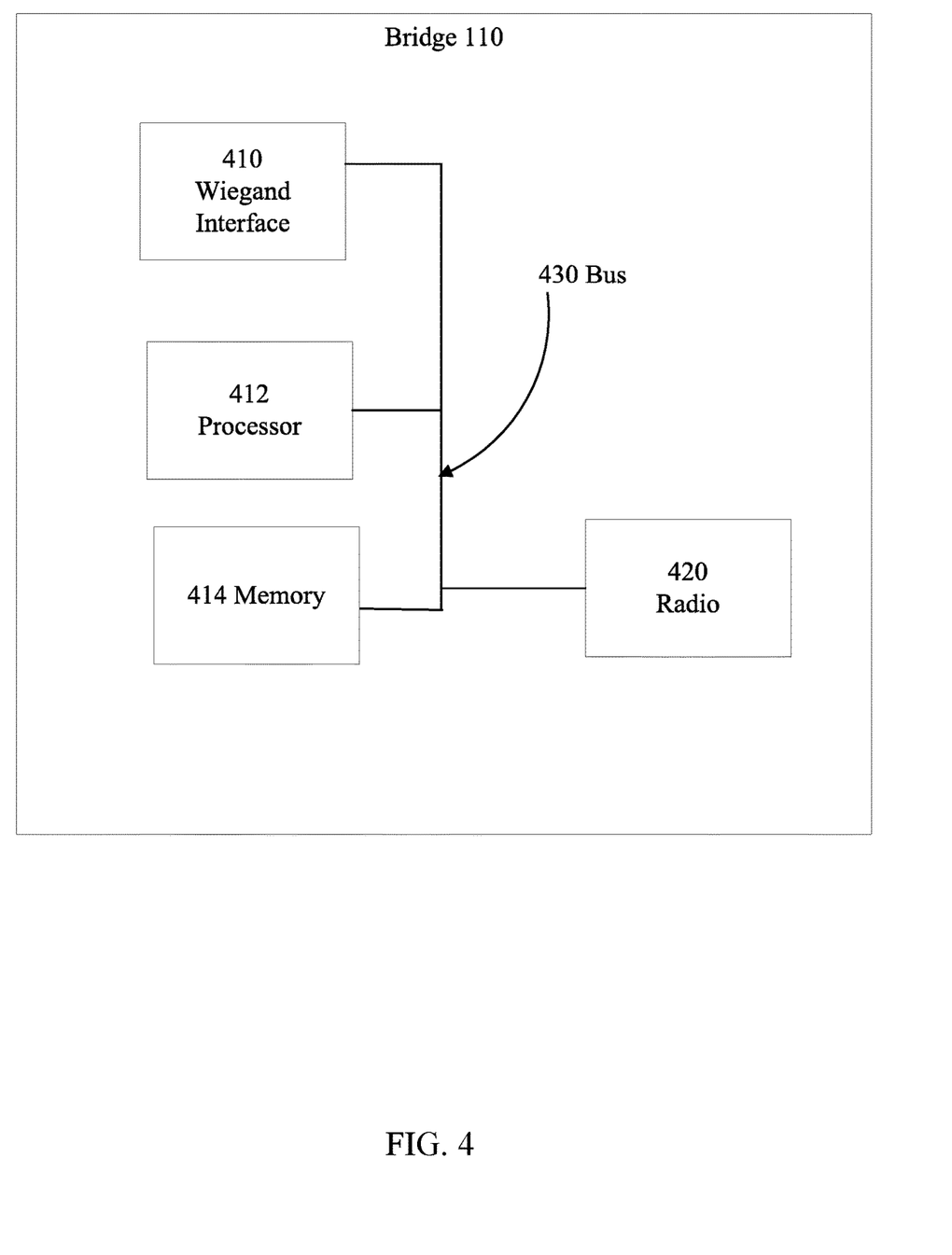
FIG. 4 is a schematic block diagram of one embodiment of a bridge showing the hardware components that may be used to make up the bridge.

Turning to FIG. 4, a schematic block diagram of one embodiment of a bridge 110 is shown. The bridge 110 may include a processor 412, a memory 414, a radio 420 and a Wiegand interface 410. The memory 414 typically contains a series of instructions accessible by and executable by the processor 412. The bus 430 may be a single bus or a plurality of buses connecting the various components of bridge 110. The Wiegand interface 410 receives messages from the second device 120 and sends responses to second device 120. The radio 420 implements the wireless communications between bridge 110 and bridge 130. The radio 420 may be connected to an antenna 156 as illustrated in FIG. 1, for example. The memory 414 typically contains instructions which when executed by the processor carry out the functions of the normalization module 114 as well as other functions necessary to carry out the functions of the bridge 110. It should be noted that an alternative embodiment of bridge 110 which is not shown here, but which could be implemented easily by those skilled in the art, may be implemented using hardware devices without the use of a processor, memory, or a bus.

Figure 5:
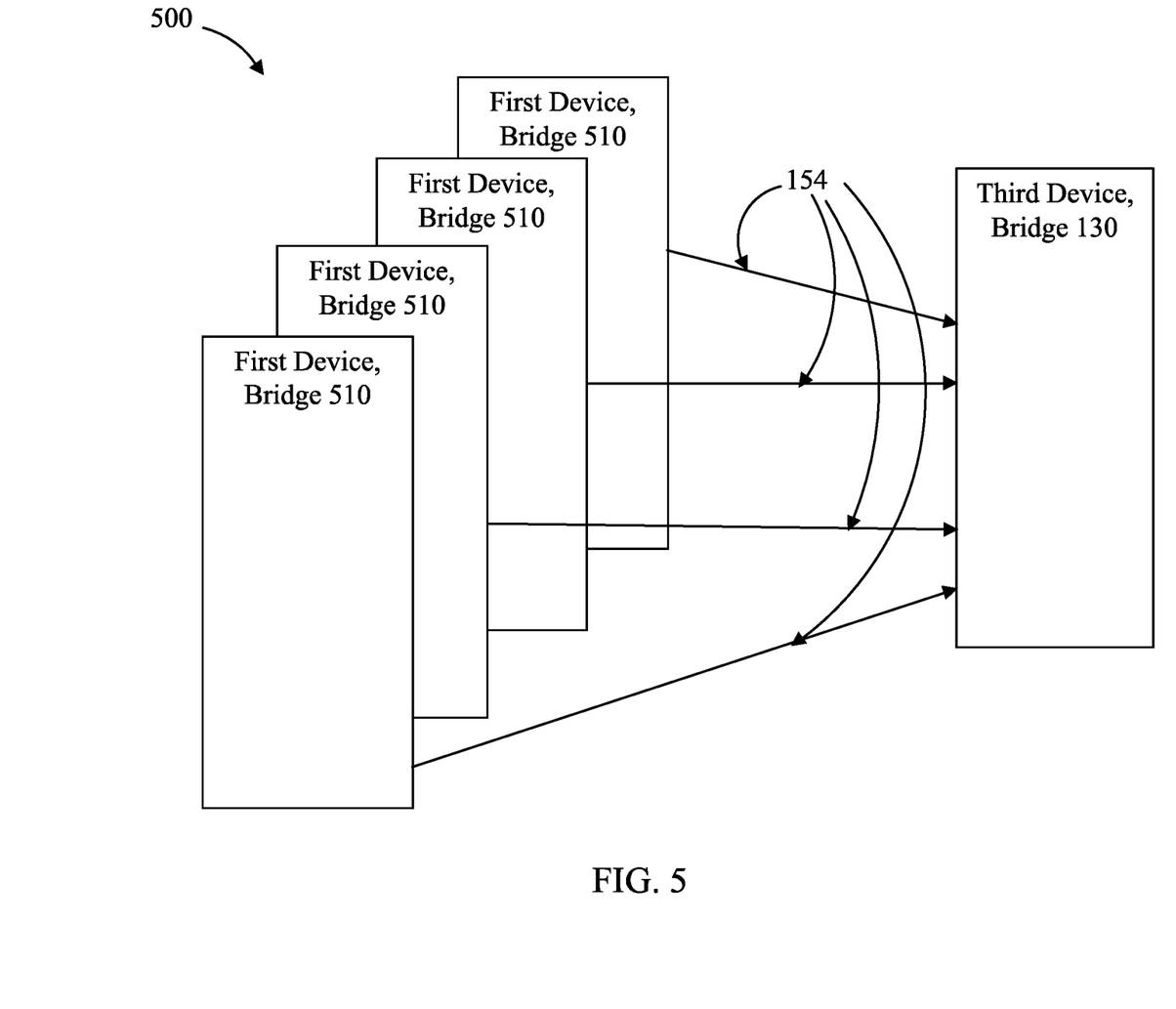
FIG. 5 is a diagram showing a system for transmitter side normalization of wireless communications with a plurality of client bridges.

Turning to FIG. 5, FIG. 5 illustrates a block diagram of a system 500 for transmitter side normalization of wireless communications with a plurality of client bridges 510. It is appreciated that bridges (e.g., bridges 110, 130) may be paired in a 1:1 arrangement as illustrated in FIGS. 1-3, for example, or may be paired with a hub or other bridge in a many:1, 1:many, or many:many arrangement. As illustrated in FIG. 5, a series of client bridges 510 connect to a single bridge 130. The client bridges 510 in FIG. 5 play the same role as bridge 110, with each bridge of the series of client bridges 510 connecting to the same bridge 130.

Figure 6:
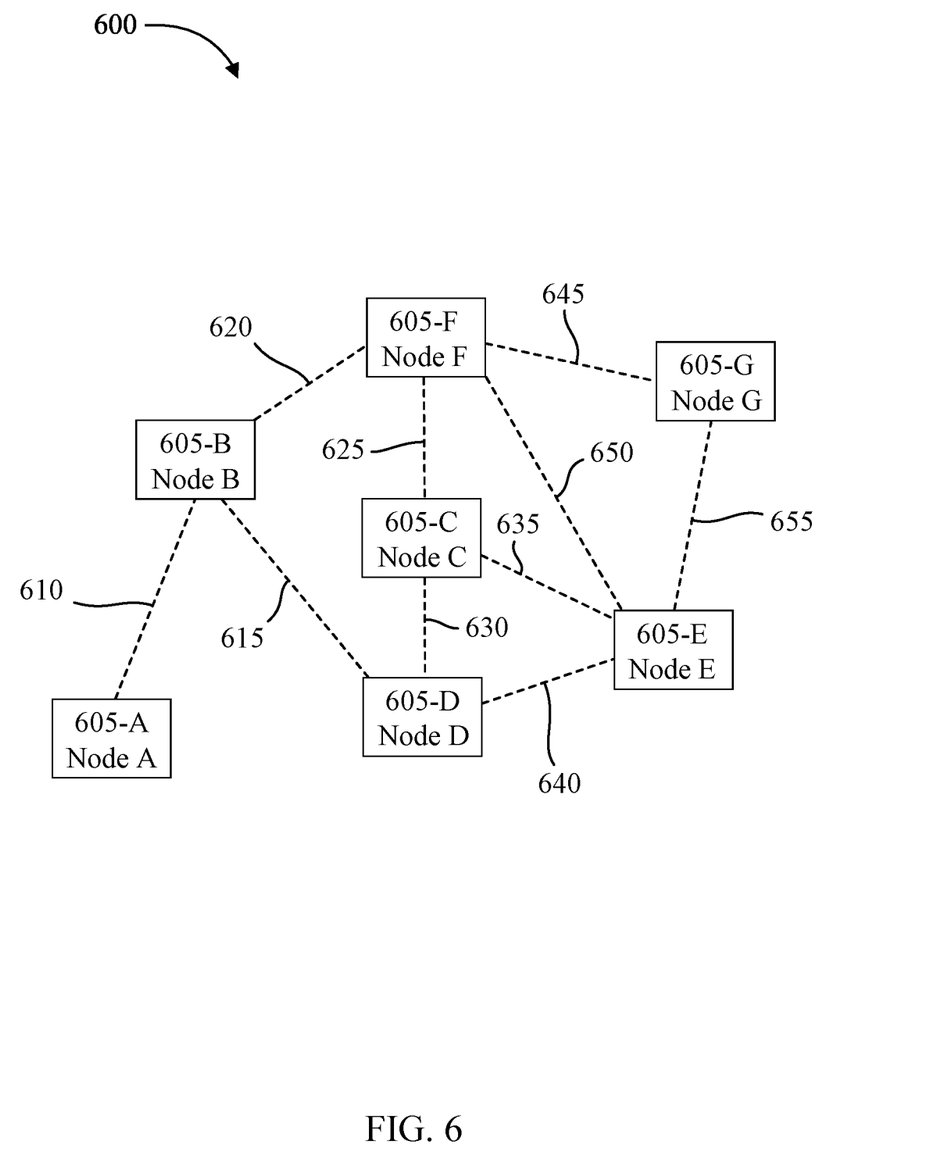
FIG. 6 is a block diagram of an exemplary embodiment in which the described device, systems, and methods may be implemented.

Tuning to FIG. 6, FIG. 6 is a block diagram of an exemplary embodiment 600 (e.g., a mesh network 600) in which the described devices, systems, and methods may be implemented. As discussed previously, timing normalization may be beneficial for creating a uniform user experience in communication systems where communication times may differ (due to different spreading factors, due to different communication paths, and/or due to other communication differences, for example). It is appreciated that timing normalization may similarly be beneficial in each of these different cases (when communication times are not guaranteed, as in mesh networks, for example).

A mesh network 600 includes multiple nodes 605 A-G. The nodes 605 A-G may be connected in any of a variety of combinations to form a mesh network 600. In one example, node A 605-A may be coupled to node B 605-B via connection 610, node B 605-b may be coupled to node F 605-F and node D 605-D via connections 620 and 615, respectively, node C 605-C may be coupled to node F 605-F, node D 605-D and node E 605-E via connections 625, 630, and 635 respectively, node D 605-D may be coupled to node B 605-B, node C 605-C, and node E 605-E via connections 615, 630, and 640, respectively, node E 605-E may be coupled to node D 605-D, node C 605-C, node F 605-F, and node G 605-G via connections 650, 635, 640, and 655, respectively, and node G 605-G may be coupled to node F 605-F and node E 605-E via connections 645 and 655, respectively. In the mesh network 600, a communication may take any of a variety of paths through the available connections. For example, a communication between node A 605-A and node E 605-E may go via connections 610, 615, and 640 (in a very direct route) or may go via connections 610, 620, 625, and 635 (in a less direct route). It is appreciated, that differences in communication paths may result in different communication times. For time sensitive applications, the described devices, systems, and methods may be used to normalize communication times to ensure a normalized user experience.

For example, in the case of a communication between node A 605-A and node E 605-E, node A 605-A may initiate a delay timer (e.g., delay timer 116) to a predetermined value. The predetermined value that is used may be based on a worst-case path through a mesh network (a least efficient, or less efficient path through the mesh network, for example). As discussed previously, this delay timer may ensure that a user experiences a normalized response time regardless of whether the communication happens quickly (due to a more efficient path through a mesh network, for example) or happens slowly (due to a less efficient path through the mesh network).

In some embodiments, the value of the delay timer (e.g., delay timer 116) is dynamically determined based on communication conditions and/or user feedback. For example, communication times may be tracked. In some cases, the 5 longest communication times may be averaged, with the default timer being determined based on the average of the longest communication times. In another example, user action based on the communication may be monitored and tracked. For example, in the case that the communication is supporting a door access system, events where a user attempts to open a door before the door has unlocked (where the user hasn't waited for a sufficient period before trying the door, for example) may be tracked. An algorithm may be used to determine a delay timer value based on the longest communication times and/or the frequency of attempts by a user to open the door early, for example. It is appreciated that various comparable use cases are similarly contemplated in view of these examples.

Figure 7:
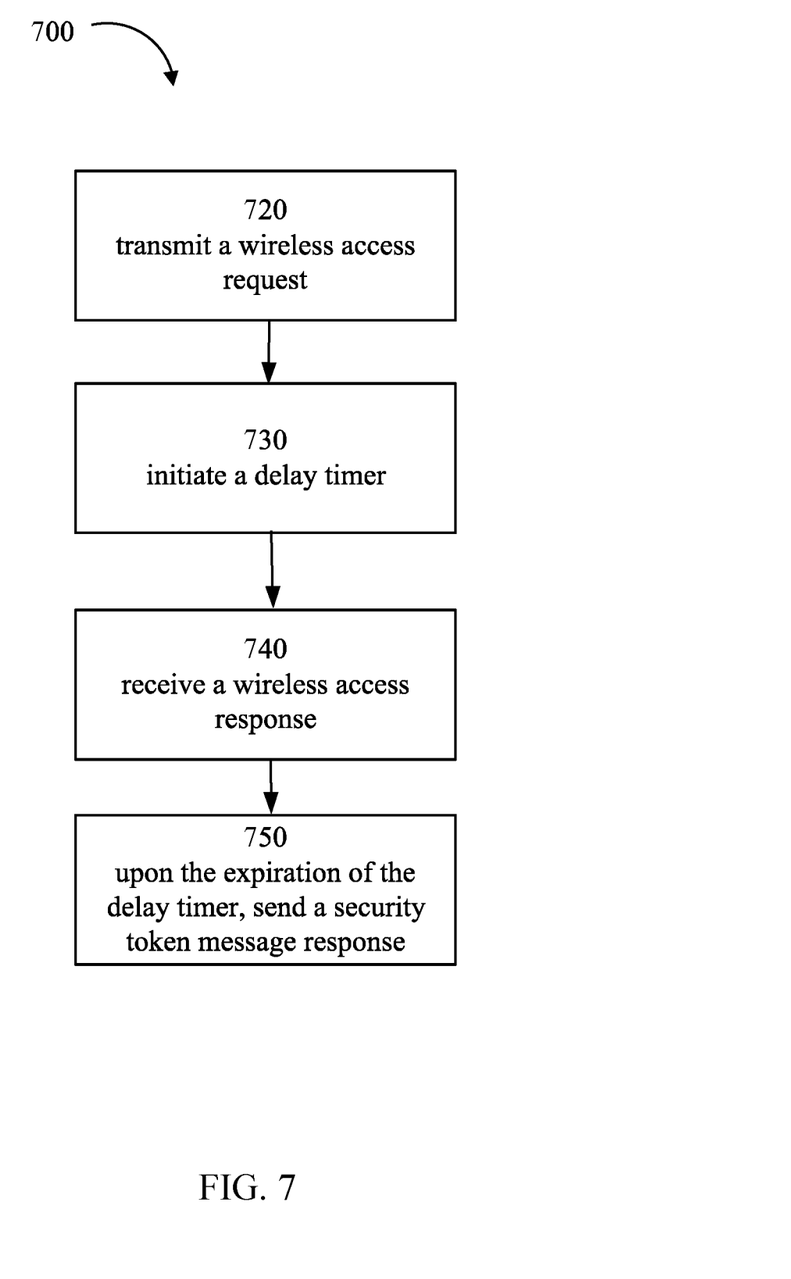
FIG. 7 is a schematic flow diagram illustrating a method 700 for transmitter side normalization of wireless communications.

Turning to FIG. 7, FIG. 7 is a schematic flow diagram illustrating a method 700 for transmitter side normalization of wireless communications. The method 700 may be performed by a bridge 110 or other device.

The method 700 comprises a series of steps. At step 720 a wireless access request 208 is transmitted to a bridge 110. At step 730 a delay timer 116 is initiated substantially at the same time as the wireless access request 208 is transmitted. At step 740 a wireless access response 214 is received. At step 750 upon the expiration 216 of the delay timer 116, a security token message response 218 is transmitted.

Various techniques, or certain aspects or portions thereof, may take the form of program code (i.e., instructions) embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The bridge (hub, or other base station) and bridge (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

The invention claimed is:

1. A method for normalizing communication between devices, comprising:
    receiving, by a first device, a first message via a wired protocol from a second device;
    transmitting, by the first device, a second message to a third device via a wireless protocol, wherein the second message is transmitted using a first spreading factor;
    initiating, by the first device, a delay timer upon transmitting the second message, wherein a duration of the delay timer is based on a second spreading factor, wherein the second spreading factor is greater than or equal to the first spreading factor;
    prior to the expiration of the delay timer, receiving, by the first device, a third message from the third device via the wireless protocol, wherein the third message is transmitted using the first spreading factor, and wherein the third message is in response to the second message;
    generating, by the first device, a fourth message based on the received third message;
    delaying, by the first device, sending of the fourth message until expiration of the delay timer; and
    upon the expiration of the delay timer, sending, by the first device, the fourth message to the second device via the wired protocol.

2. The method of claim 1, wherein the second message is based on the first message.

3. The method of claim 1, wherein the wired protocol comprises a Wiegand protocol.

4. The method of claim 1, wherein the wireless protocol comprises a low power wide area network (WPLAN) protocol, wherein the WPLAN protocol comprises a long range and (LoRa) protocol.

5. The method of claim 1, further comprising:
    determining that the second message should be retransmitted based on at least one of a NACK from the third device or an expiration of a timeout timer without a receipt of an acknowledgment ACK from the third device; and
    retransmitting the second message to the third device via the wireless protocol, wherein the second message is retransmitted using the first spreading factor.

6. The method of claim 1, further comprising transmitting an ACK to the third device in response to the third message.

7. The method of claim 1, wherein the first spreading factor is negotiated with the third device, and wherein the second spreading factor is predefined.

8. The method of claim 1, wherein the first spreading factor is lower than spreading factor 12.

9. The method of claim 1, further comprising receiving a configuration message from the third device, wherein the configuration message indicates an updated duration for the delay timer.

10. The method of claim 1, further comprising:
determining a value of the delay timer based on at least one of user feedback and actual communication times.

11. A device for normalizing wireless communications, comprising:
a processor; and
a memory in electronic communication with the processor;
instructions stored in the memory, the instructions being executable by the processor to:
receive, by the device, a first message via a wired protocol from a second device;
transmit, by the device, a second message to a third device via a wireless protocol, wherein the second message is transmitted using a first spreading factor;
initiate, by the device, a delay timer upon transmitting the second message, wherein a duration of the delay timer is based on a second spreading factor, wherein the second spreading factor is greater than or equal to the first spreading factor;
prior to the expiration of the delay timer, receive, by the device, a third message from the third device via the wireless protocol, wherein the third message is transmitted using the first spreading factor, and wherein the third message is in response to the second message;
generate a fourth message based on the received third message;
delay sending of the fourth message until expiration of the delay timer; and
upon the expiration of the delay timer, send, by the device, the fourth message to the second device via the wired protocol.

12. The device of claim 11, wherein the second spreading factor is larger than the first spreading factor.

13. The device of claim 11 wherein the second message is based on the first message.

14. The device of claim 11, wherein the wireless protocol comprises a low power wide area network (WPLAN) protocol, wherein the WPLAN protocol comprises a long range and (LoRa) protocol.

15. The device of claim 11, wherein the instructions are further executable by the processor to:
determine that the second message should be retransmitted based on at least one of a NACK from the third device or an expiration of a timeout timer without a receipt of an ACK from the third device; and
transmit the second message to the third device via the wireless protocol, wherein the second message is retransmitted using the first spreading factor.

16. The device of claim 11, wherein the instructions are further executable by the processor to transmit an ACK to the third device in response to the third message.

17. The device of claim 11, wherein the first spreading factor is negotiated with the third device, and wherein the second spreading factor is predefined.

18. The device of claim 11, wherein the first spreading factor is lower than spreading factor 12.

19. The device of claim 11, wherein the instructions are further executable by the processor to receive a configuration message from the third device, wherein the configuration message indicates an updated duration for the delay timer.

20. The device of claim 11, wherein the instructions are further executable by the processor to:
determine a value of the delay timer based on at least one of user feedback and actual communication times.

* * * * *